(12) United States Patent
Mikami et al.

(10) Patent No.: US 7,486,225 B2
(45) Date of Patent: Feb. 3, 2009

(54) RADAR DEVICE

(75) Inventors: Satoshi Mikami, Sapporo (JP); Masayoshi Sueya, Sapporo (JP)

(73) Assignee: Fujitsu Limited, Kawasaki-Shi Kanagawa (JP)

( * ) Notice: Subject to any disclaimer, the term of this patent is extended or adjusted under 35 U.S.C. 154(b) by 0 days.

(21) Appl. No.: 11/902,651

(22) Filed: Sep. 24, 2007

(65) Prior Publication Data
US 2008/0180311 A1   Jul. 31, 2008

Related U.S. Application Data

(62) Division of application No. 10/847,385, filed on May 18, 2004.

(30) Foreign Application Priority Data
Nov. 25, 2003   (JP)   ............... 2003-393489

(51) Int. Cl.
*G01S 13/42* (2006.01)
(52) U.S. Cl. .................. 342/109; 342/189; 342/194; 342/89; 342/145; 342/159
(58) Field of Classification Search ............ 342/70–72, 342/21, 82–103, 107–116, 128–135, 145, 342/152, 159, 173–174, 194–195; 375/1, 375/130–153
See application file for complete search history.

(56) References Cited

U.S. PATENT DOCUMENTS

| | | | | |
|---|---|---|---|---|
| 4,630,283 A | * | 12/1986 | Schiff ..................... | 375/143 |
| 5,305,349 A | * | 4/1994 | Dent ....................... | 370/209 |
| 5,440,311 A | * | 8/1995 | Gallagher et al. ......... | 342/132 |
| 5,999,561 A | * | 12/1999 | Naden et al. ............ | 375/142 |
| 6,639,939 B1 | * | 10/2003 | Naden et al. ............ | 375/140 |
| 6,963,727 B2 | * | 11/2005 | Shreve ................... | 455/39 |
| 7,199,751 B2 | * | 4/2007 | Mikami et al. ........... | 342/109 |
| 2002/0061081 A1 | * | 5/2002 | Richards et al. ......... | 375/346 |
| 2003/0022680 A1 | * | 1/2003 | Shreve ................... | 455/504 |
| 2005/0275583 A1 | * | 12/2005 | Mikami et al. ........... | 342/109 |

FOREIGN PATENT DOCUMENTS

JP          5-175936          7/1993

(Continued)

OTHER PUBLICATIONS

Patent Abstracts of Japan, Publication No. 2004-236097, Published Aug. 19, 2004.

(Continued)

*Primary Examiner*—John B Sotomayor
(74) *Attorney, Agent, or Firm*—Fujitsu Patent Center

(57) ABSTRACT

A data code generator produces a data code, while a reference code generator produces a reference code. The data code is phase-shifted by the data code generator in a predetermined sweep range, according to a sweep command signal given by a phase difference detector. The phase difference detector compares the phase of the data code with that of the reference code to obtain phase difference data. Based on the phase difference data, a correction signal generator produces a correction signal to keep the data code in phase with the reference, code. The phase setter optimizes the phase of the data code according to the correction signal.

4 Claims, 15 Drawing Sheets

FOREIGN PATENT DOCUMENTS

JP          2005351862 A  *  12/2005

OTHER PUBLICATIONS

S. Noda et al.: "A study on automotive millimeter-wave radar using SS technique", Proceeding of the 1997 IEICE General Conference, (1997), SA-4-4 (3 pages) with translation (4 pages).
Patent Abstracts of Japan, Publication No. 6-164623, Published Jun. 10, 1994.
Patent Abstracts of Japan, Publication No. 2001-033542, Published Feb. 9, 2001.
Patent Abstracts of Japan, Publication No. 05-122182, Published May 18, 1993.
Patent Abstracts of Japan, Publication No. 2002-223189, Published Aug. 9, 2002.
Japanese Office Action dated Dec. 4, 2007 issued in corresponding Japanese Application No. 2003-393489.
Patent Abstracts of Japan Pub. No. 09-149014, published Jun. 6, 1997.
Patent Abstracts of Japan Pub. No. 2000-009833, published Jan. 14, 2000.

* cited by examiner

RADAR DEVICE

CROSS-REFERENCE TO RELATED APPLICATIONS

This application is a divisional of U.S. application Ser. No. 10/847,385 filed May 18, 2004 which claims priority of Japanese Patent Application No. 2003-393489 filed Nov. 25, 2003, the contents of both of which are incorporated herein by reference.

BACKGROUND OF THE INVENTION

1. Field of the Invention

The present invention relates to a data code transmission device, and more particularly to a data code transmission device with a function of correcting the phase of data codes to be transmitted.

2. Description of the Related Art

Various types of digital interfaces have been developed and used for data transfer between a personal computer and its peripheral devices. They include parallel interfaces such as the Small Computer System Interface (SCSI) and serial interfaces such as the Universal Serial Bus (USB). While those standard interfaces are not particularly fast, they offer sufficient performance in transferring text files and other kinds of lightweight data objects.

The recent advancement of multimedia technologies including image data compression techniques has enabled personal computer users to manipulate digital video data on their machines. Many people today take video snapshots with their own camcorders. Such personal video users may wish, for example, to view their videos on a computer screen while uploading the data from a digital camcorder. However, the existing interfaces such as SCSI and USB mentioned above are not suitable for such realtime, large data transfer applications. The multimedia needs in recent years have thus led to the emergence of a new generation of high-speed serial lines or buses. The high-speed serial lines transport data serially at a high bitrate over a single transmission line.

Typical applications of recent high-performance serial lines include connections on a backplane (a circuit board having connectors and slots to serve as a backbone to connect several cards together to make up a complete electronic system). A new serial backplane connection offers a data transfer speed of as high as 3 Gbps, and further development is under way for faster interface.

Besides serving as an interface for personal computer peripherals, high-speed serial transmission techniques facilitate internal transport of signals in various systems. One application is a radar device that detects and determines the distance of objects by using a spread spectrum technique. This device emits a radio wave modulated with spreading codes, analyzes a reflected signal with a correlation detection algorithm, and determines the object distance from the power of correlation-detected values. High-speed serial lines are used here to distribute internally generated serial spreading codes to correlation detection circuits inside the device.

Typical devices for high-speed serial interface include serializers for parallel-to-serial conversion and deserializers for serial-to-parallel conversion, which are collectively referred to as SerDes devices. Serializers consolidates a plurality of low-speed parallel signals into a single high-speed serial signal, whereas deserializers recover clock and data signals from a received high-speed serial signal to reconstruct the original parallel data signals.

Data bits transmitted over a plurality of serial lines, however, may not necessarily reach the destination at the same time; the signals may have different phases at the receiving end. Since those phase differences degrade transmission quality, an appropriate correction technique has to be implemented in such multi-channel systems so that the serial lines will be in phase with each other or locked in a specified phase. Several researchers have proposed the use of buffers to temporarily store a plurality of signals in the form of cells, the read timings for which are controlled such that their outputs will have no phase differences. See, for example, the Japanese Patent Application Publication No. 6-164623 (1994), paragraphs [0009] to [0027] and FIG. 1.

While the phase of each signal channel may be adjusted at the transmitting end, but the characteristics of transmission lines (e.g., backplane) would affect the phase of individual signals before they arrive at the destination. For this reason, most conventional systems are designed to correct phase error on the receiver side. SerDes devices are not an exception. Their phase difference compensation function is implemented only in deserializers used at the receiving end. The lack of phase correction capability at the sending end is a problem for such systems that use received high-speed serial signals without serial-to-parallel conversion and thus have no deserializer devices. This leads to a demand for development of serial data transmitters with phase correction functions.

The aforementioned Japanese Patent Application Publication No. 6-164623 discloses bitwise phase correction based on the difference detected in synchronization with clock pulses. The bitwise method, however, does not work for phase differences smaller than one bit time, such as those derived from transmission line characteristics. Also, the conventional clock-based design for phase difference detection circuits is unsuitable for serial interface with speeds of several gigabits per second, since it requires a clock frequency much higher than the transmission rate.

FIGS. 15A and 15B illustrate a problem of a phase difference smaller than a single bit time. Specifically, FIG. 15A shows data bits with a delay of two bit times with respect to reference data, which can be corrected by a process of bit-by-bit phase difference correction. FIG. 15B, on the other hand, shows a delay of one and half bits. Conventional phase difference correction, however, is unable to correct error of a fraction of bit time.

SUMMARY OF THE INVENTION

In view of the foregoing, it is an object of the present invention to provide a data code transmission device that detects and corrects phase differences between a plurality of high-speed serial lines effectively at the sending end to ensure the quality of data transmission.

It is another object of the present invention to provide a radar device that applies the data code transmission device with the above features.

To accomplish the first object stated above, the present invention provides a data code transmission device that transmits a data code with a corrected phase. This data code transmission device comprises a reference code generator that generates a reference code; a phase corrector; and a data code transmitter. The phase corrector has a phase difference detector that produces a sweep command signal for use in shifting the phase of a data code in a predetermined sweep range and compares the phase of the data code being shifted with the phase of the reference code to obtain phase difference data. It also has a correction signal generator that produces a correction signal, based on the phase difference data, to keep the data code in phase with the reference code. The data code transmitter has a data code generator that produces the data code, and a phase setter that shifts the data code in response to the sweep command signal and optimizes the phase of the data code according to the correction signal.

Further, to accomplish the second object mentioned above, the present invention provides a radar device that detects an object. This radar device comprises, among others, a spreading code generator device. The spreading code generator device has a reference code generator, a phase corrector, and a spreading code generator. The reference code generator produces a reference code. The phase corrector produces a sweep command signal for use in shifting the phase of a spreading code in a predetermined sweep range, compares the phase of the spreading code being shifted with the phase of the reference code to obtain phase difference data, and produces a correction signal based on the phase difference data to keep the spreading code in phase with the reference code. The spreading code generator shifts the spreading code in response to a sweep command signal and optimizes the phase of the spreading code according to a correction signal. The radar device further comprises a set of radio wave signal transmitter and receiver, a correlation detector, and a speed/distance detector. The radio wave signal transmitter produces a radio wave signal by modulating a carrier wave with the reference code and emits the radio wave signal into the air. The radio wave signal receiver receives the radio wave signal reflected by an object and demodulates the received radio wave signal into an in-phase component and a quadrature component. The correlation detector produces correlation-detected values by performing correlation detection of the in-phase and quadrature components using the spreading code. The speed/distance detector calculates power of correlation-detected values to determine the distance to and the speed of the object.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
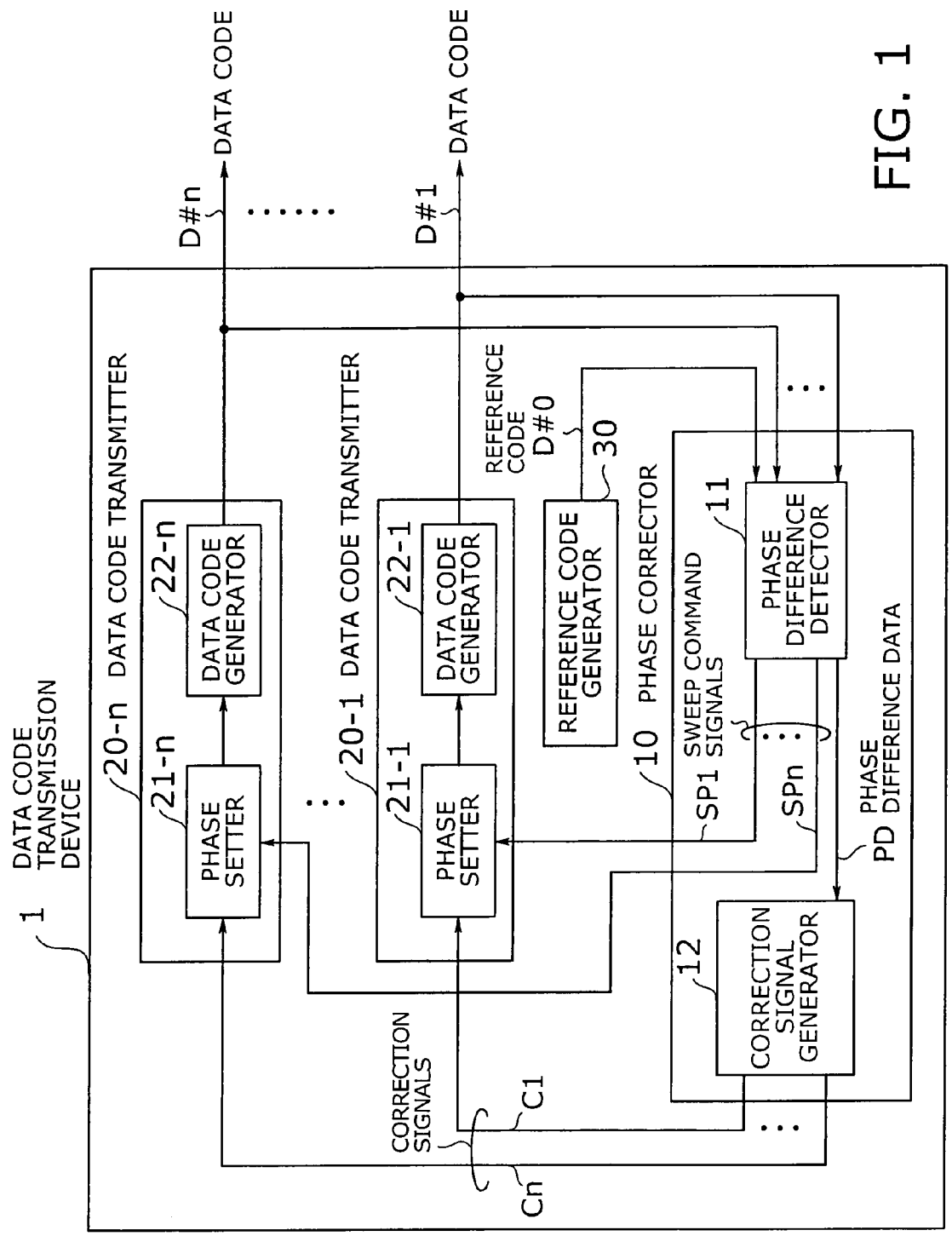
FIG. 1 is a conceptual view of a data code transmission device according to the present invention.

Preferred embodiments of the present invention will be described below with reference to the accompanying drawings, wherein like reference numerals refer to like elements throughout.

FIG. 1 is a conceptual view of a data code transmission device according to the present invention. The data code transmission device 1 transmits a plurality of data codes D#1 to D#n in a phase-coherent manner. To correct their phase at the sending end, the illustrated device comprises the following elements: a reference code generator 30, a phase corrector 10, and a plurality of data code transmitters 20-1 to 20-n.

The reference code generator 30 produces a reference code D#0. The phase corrector 10 comprises a phase difference detector 11 and a correction signal generator 12. The phase difference detector 11 produces sweep command signals SP1 to SPn at the time of initialization, for use in shifting the phase of data codes D#1 to D#n in a predetermined sweep range. The phase difference detector 11 compares the phase of each data code D#1 to D#n being shifted with that of the reference code D#0, thus obtaining phase difference data PD. From this phase difference data PD, the correction signal generator 12 produces corresponding correction signals C1 to Cn to keep the data codes D#1 to D#n in phase with the reference code D#0.

The first data code transmitter 20-1 comprises a phase setter 21-1 and a data code generator 22-1. The second to nth data code transmitters 20-2 to 20-n have their own phase setters 21-2 to 21-n and data code generators 22-2 to 22-n, although not all of them are shown in FIG. 1. The data code generators 22-1 to 22-n produce data codes D#1 to D#n, respectively. The phase setters 21-1 to 21-n shift their respective data codes D#1 to D#n when so directed by corresponding sweep command signals SP1 to SPn. They also optimize the phase of data codes D#1 to D#n according to corresponding correction signals C1 to Cn.

Figure 2:
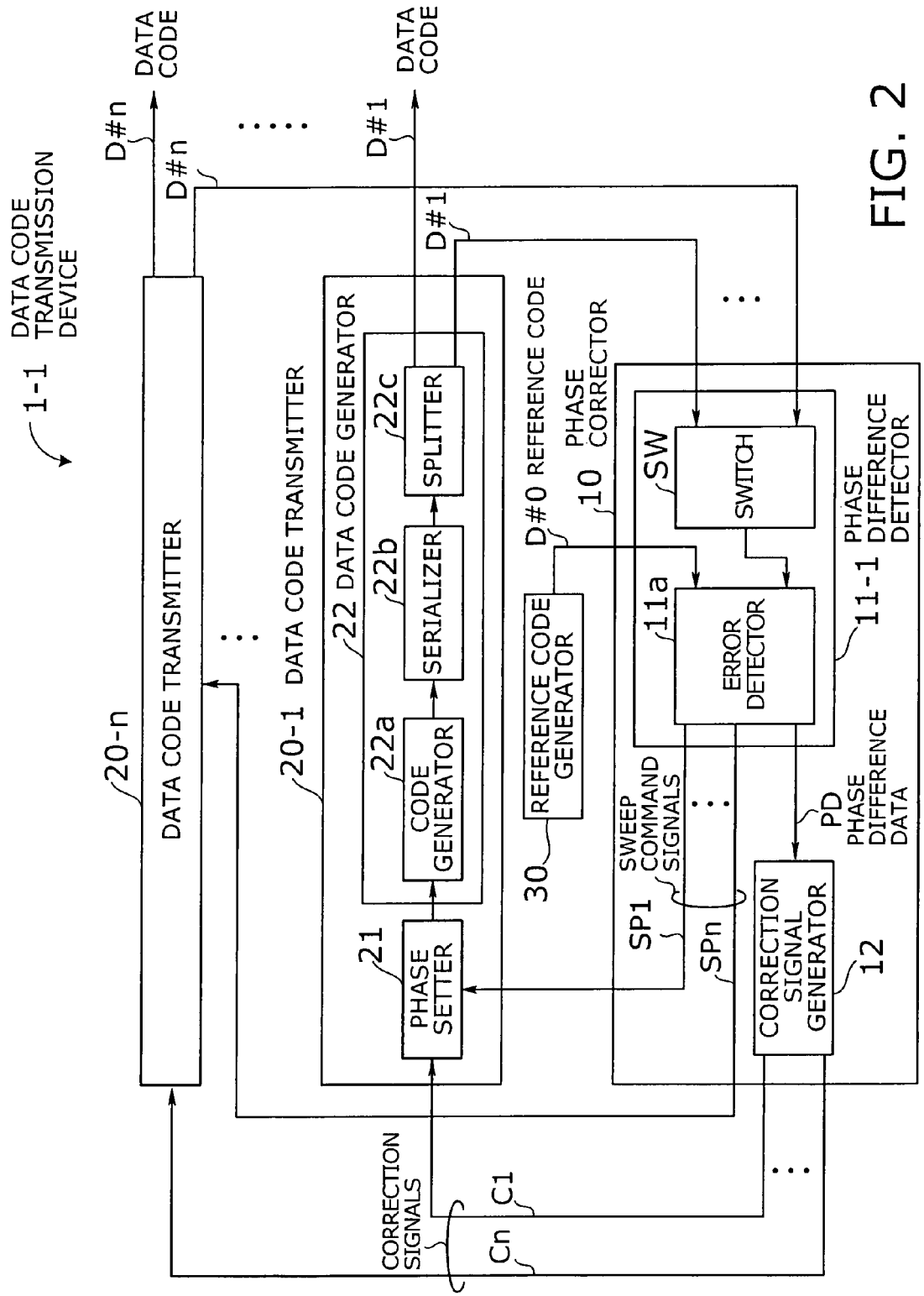
FIG. 2 is a block diagram of a data code transmission device according to the present invention.

A more specific structure and operation of the proposed data code transmission device will now be described below. FIG. 2 is a block diagram of a data code transmission device according to the present invention. The phase corrector 10 in this data code transmission device 1-1 has a phase difference detector 11-1 and a correction signal generator 12. The phase difference detector 11-1 contains a switch SW and an error detector 11a. Each data code transmitter 20-1 to 20-n has a phase setter 21 and a data code generator 22. The data code generator 22 is composed of a code generator 22a, a serializer 22b, and a splitter 22c, and so is the reference code generator 30.

Data codes D#1 to D#n are sent out of the data code transmitters 20-1 to 20-n, each being in phase with reference code D#0. The following will explain how this feature is realized in the present invention, taking data code D#1 produced by the first data code transmitter 20-1, for example.

At the time of initialization, the code generator 22a generates a data code, which the serializer 22b converts into a serial signal. The splitter 22c produces two replicas of this serial signal and sends one out through a port of the device 1-1 while routing the other to the phase corrector 10.

In the phase compensator 10, the switch SW selects one of its data code inputs D#1 to D#n, and we assume that the data code D#1 is currently selected. The error detector 11a receives reference code D#0 from the reference code generator 30 and data code D#1 from the switch SW and compares their code bit values to yield a code error rate of D#1. The comparison result is provided to the correction signal generator 12 as phase difference data PD. During this process, the error detector 11a sends a sweep command signal SP1 to the phase setter 21 to cause the phase of data code D#1 to vary within a predetermined sweep range. Based on this sweep command signal SP1, the phase setter 21 controls its corresponding code generator 22a so that the data code D#1 will have the specified phase. The error detector 11a compares the phase of data code D#1 with that of the reference code D#0 by detecting errors while sweeping the former over the specified range.

When the sweep is finished, the correction signal generator 12 consults the resulting phase difference data PD and produces a correction signal C1 to make the data code D#1 align with the reference code D#0. In the present embodiment, the correction signal C1 indicates the minimum code error and its phase angle identified from the received phase difference data PD.

The phase setter 21 gives an optimal phase to data code D#1 according to the given correction signal C1, and the data code generator 22 outputs data code D#1 with the specified phase. The same phase correction process as described above is applied to all the remaining data codes D#2 to D#n, so that the data code transmission device 1-1 can send all D#1 to D#n in phase when it is in operation.

Figure 3:
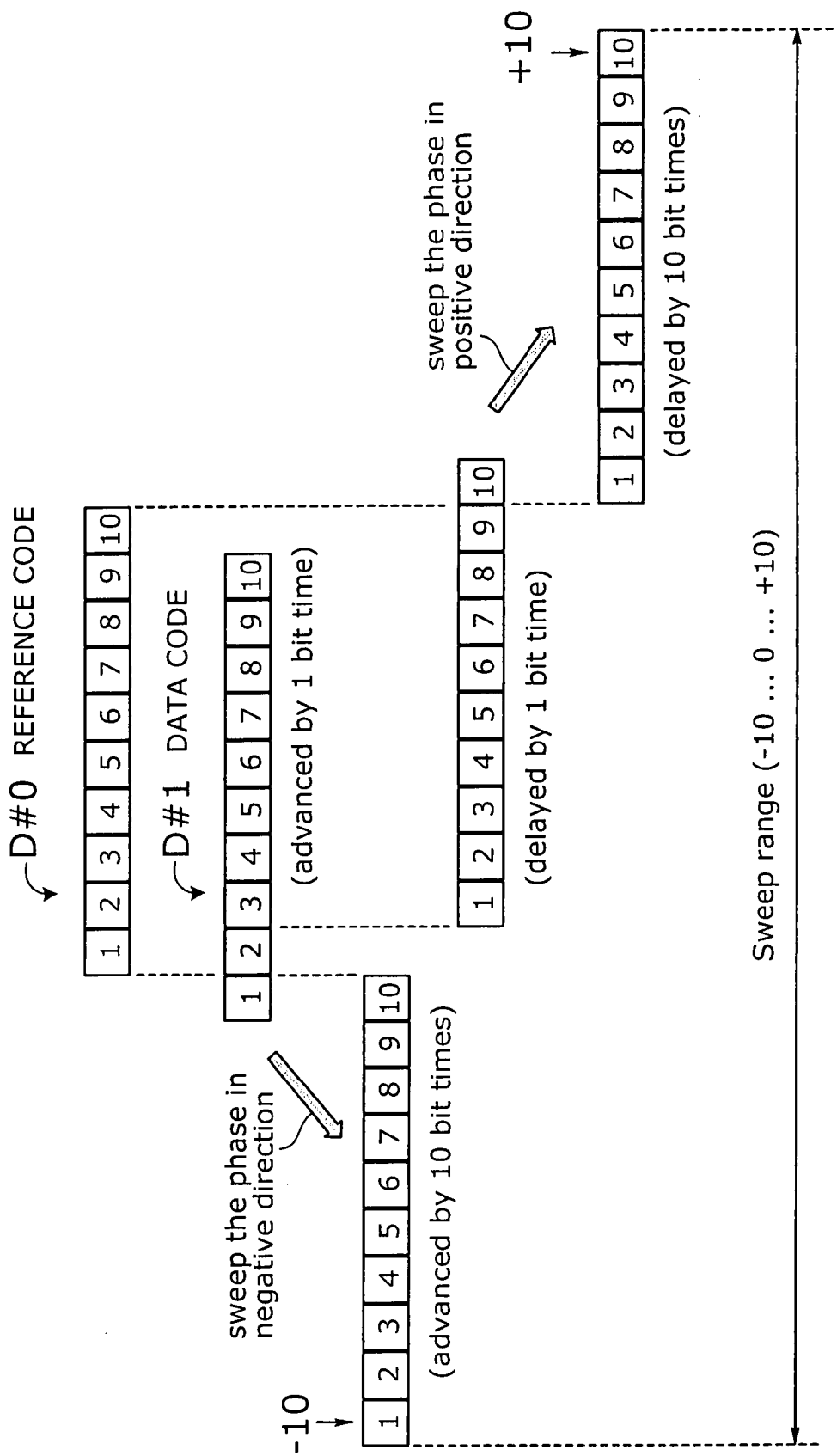
FIG. 3 shows the concept of phase sweeping of a data code.
Figure 4A:
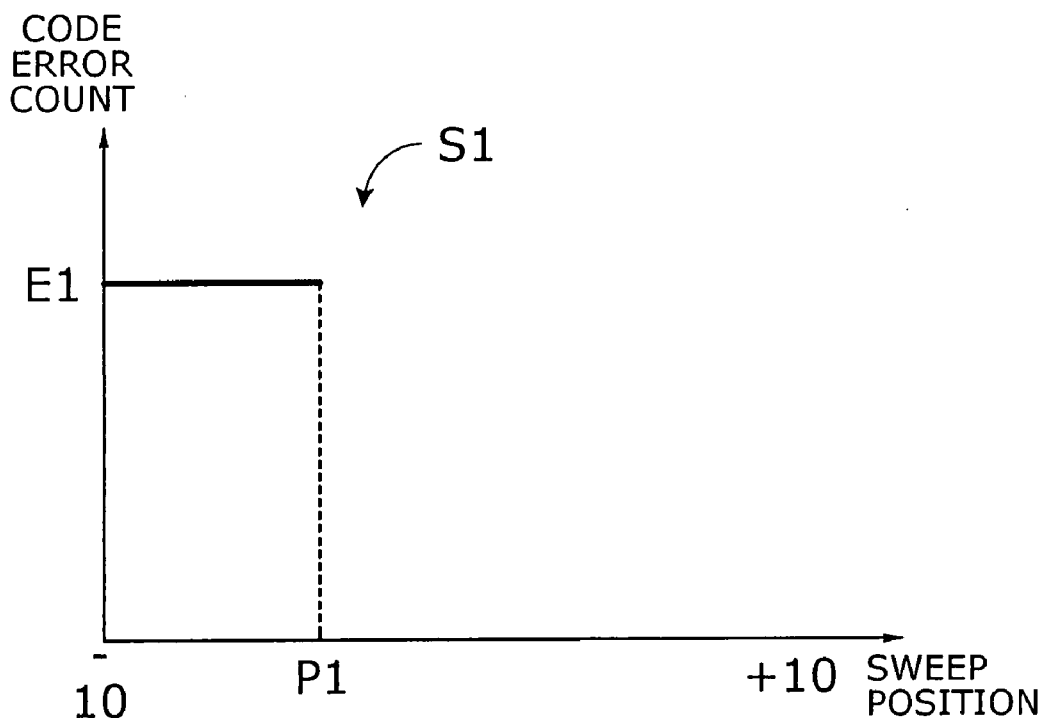
FIGS. 4A, 4B, 5A, and 5B show the code error count at various sweep positions.
Figure 4B:
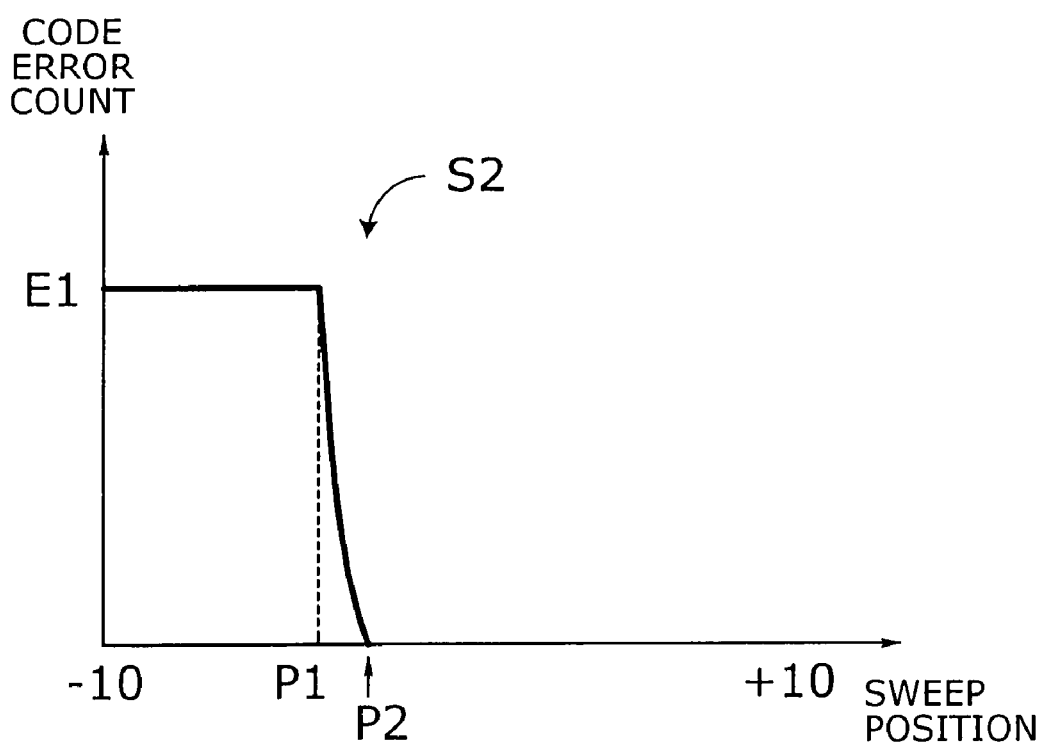
Figure 5A:
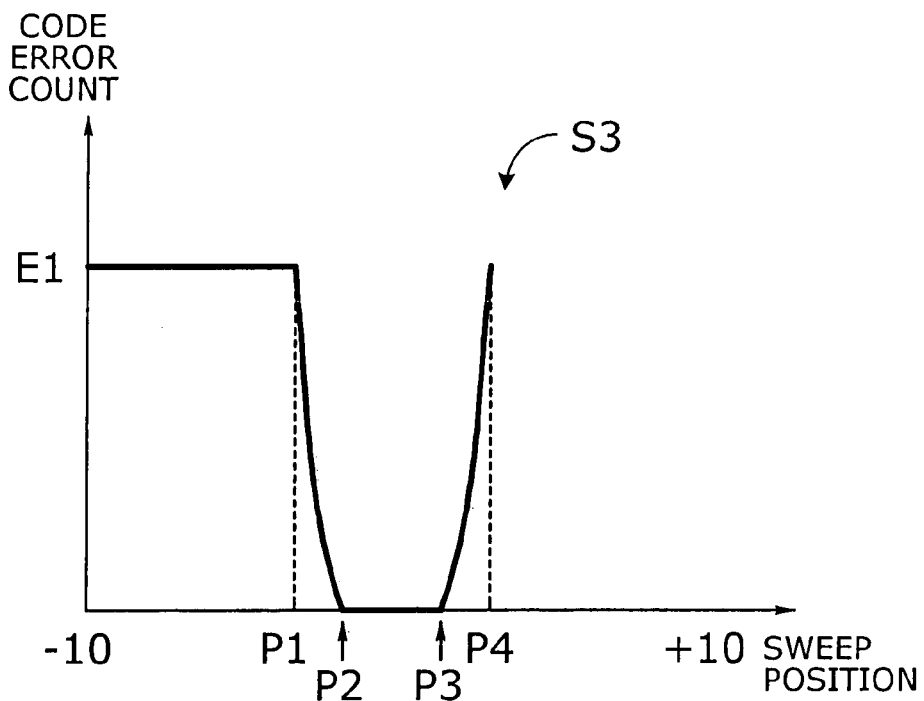
Figure 5B:
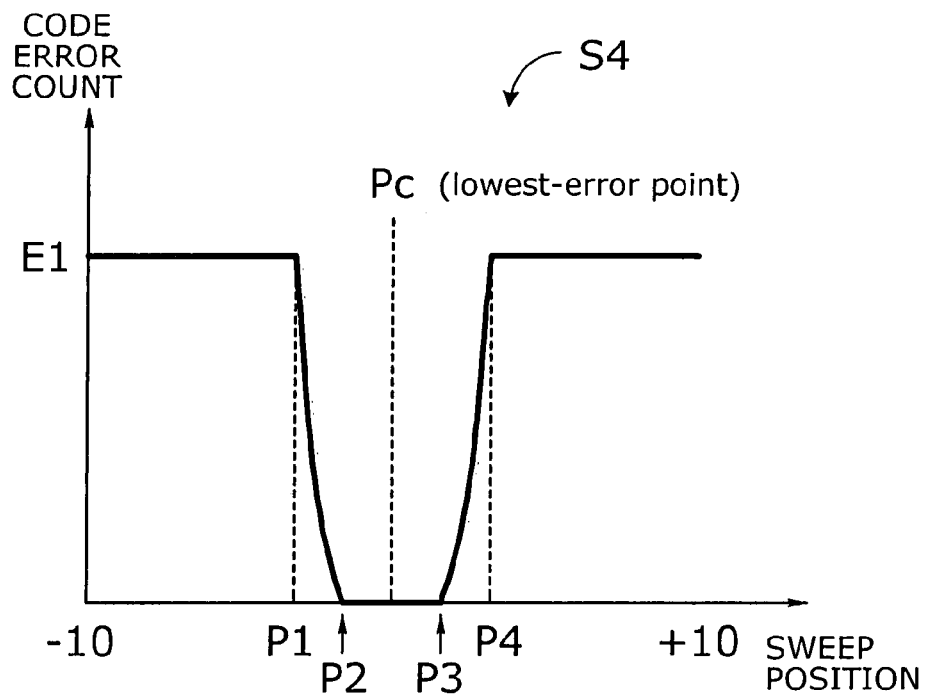

Referring next to FIG. 3 to FIG. 5, the following will describe phase correction control in the initialization stage. FIG. 3 shows the concept of phase sweeping of a data code. In this example, reference code D#0 and data code D#1 are each consist of ten code bits #1 to #10. The sweep range is −10 to +10, meaning that the distance of data code D#1 relative to reference code D#0 can be varied from −10 code bit times to +10 code bit times. The step size of sweeping is smaller than one bit time.

FIGS. 4A, 4B, 5A, and 5B show the code error count at various sweep positions. The vertical axis represents code error count, i.e., the number of code errors detected, and the horizontal axis represents sweep positions in a range of −10 to +10. The code error count changes as the data code D#1 is shifted across the given range, relative to reference data D#0. This process proceeds in the following way:

(S1) The sweep begins from point −10. The code error count is E1 until the sweep reaches point P1.

(S2) The code error count begins to decrease at point P1 and hits zero at point P2.

(S3) The code error count stays at zero in the range between points P2 and P3. After P3, it gradually increases until it reaches E1 at point P4.

(S4) The code error count stays at E1 in the remaining range, point P4 to point +10.

In this way the phase of the data code D#1 is varied within a range of −10 to +10 relative to the reference code D#0. The code error counts measured during this sweep are sent by the error detector 11a to the correction signal generator 12 as phase difference data PD. Of all the received measurements, the correction signal generator 12 extracts a piece of phase difference data with the lowest code error count and sends it as a correction signal C1 to the phase setter 21. Since the code error count becomes zero at point Pc in the present example, the data at that point is extracted as a correction signal C1, which causes the phase setter 21 to configure the code generator 22a so that the data code D#1 will start at point Pc. The code generator 22a begins generating data code D#1 according to the setup given by the phase setter 21. The above phase correction process may be applied to the remaining data code D#2 to D#n, so that the phase of every data code D#1 to D#n will be adjusted at the time of initial setup.

Figure 6:
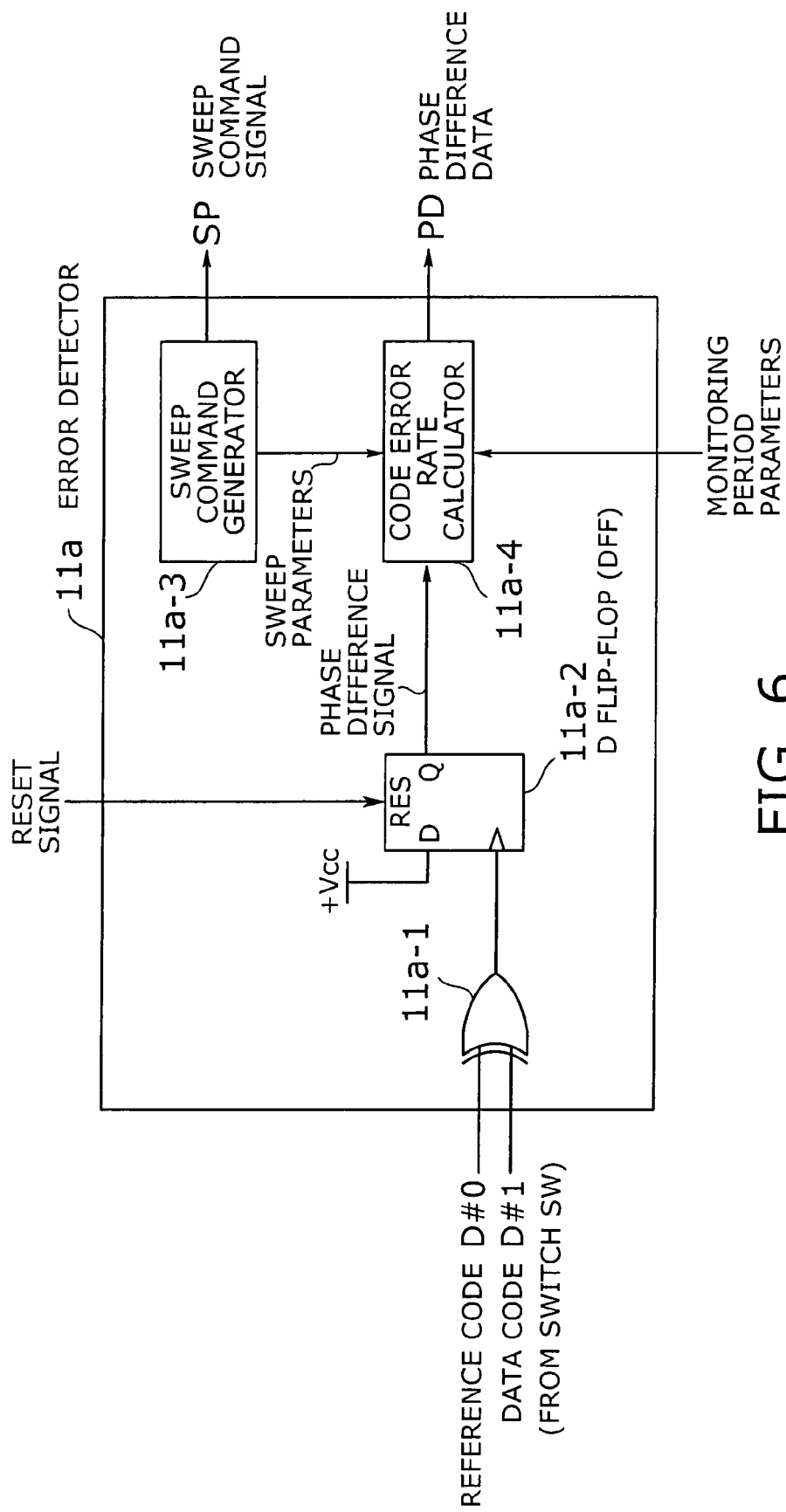
FIG. 6 shows the structure of an error detector.

Referring to FIG. 6, the detailed structure and operation of the error detector 11a will now be described below. The error detector 11a is composed of an exclusive OR (XOR) gate 11a-1, a D flip-flop 11a-2, a sweep command generator 11a-3, and a code error rate calculator 11a-4. The XOR gate 11a-1 receives reference code D#0 on one input and data code D#1 on the other input, the latter being the output of the switch SW. The output of this XOR gate 11a-1 is connected to the clock input of the D flip-flop 11a-2, whose D input is pulled up to high, and whose reset input is given a reset signal. What appears at Q output of the D flip-flop 11a-2 is a phase difference signal.

The sweep command generator 11a-3 outputs a sweep command signal SP, as well as providing the code error rate calculator 11a-4 with sweep parameters indicating how much phase offset is currently given to the data code D#1 with respect to the reference code D#0. Based on the sweep parameters, monitoring period parameters, and phase difference signal, the code error rate calculator 11a-4 calculates the current code error rate and sends out the result as phase difference data PD.

Figure 7:
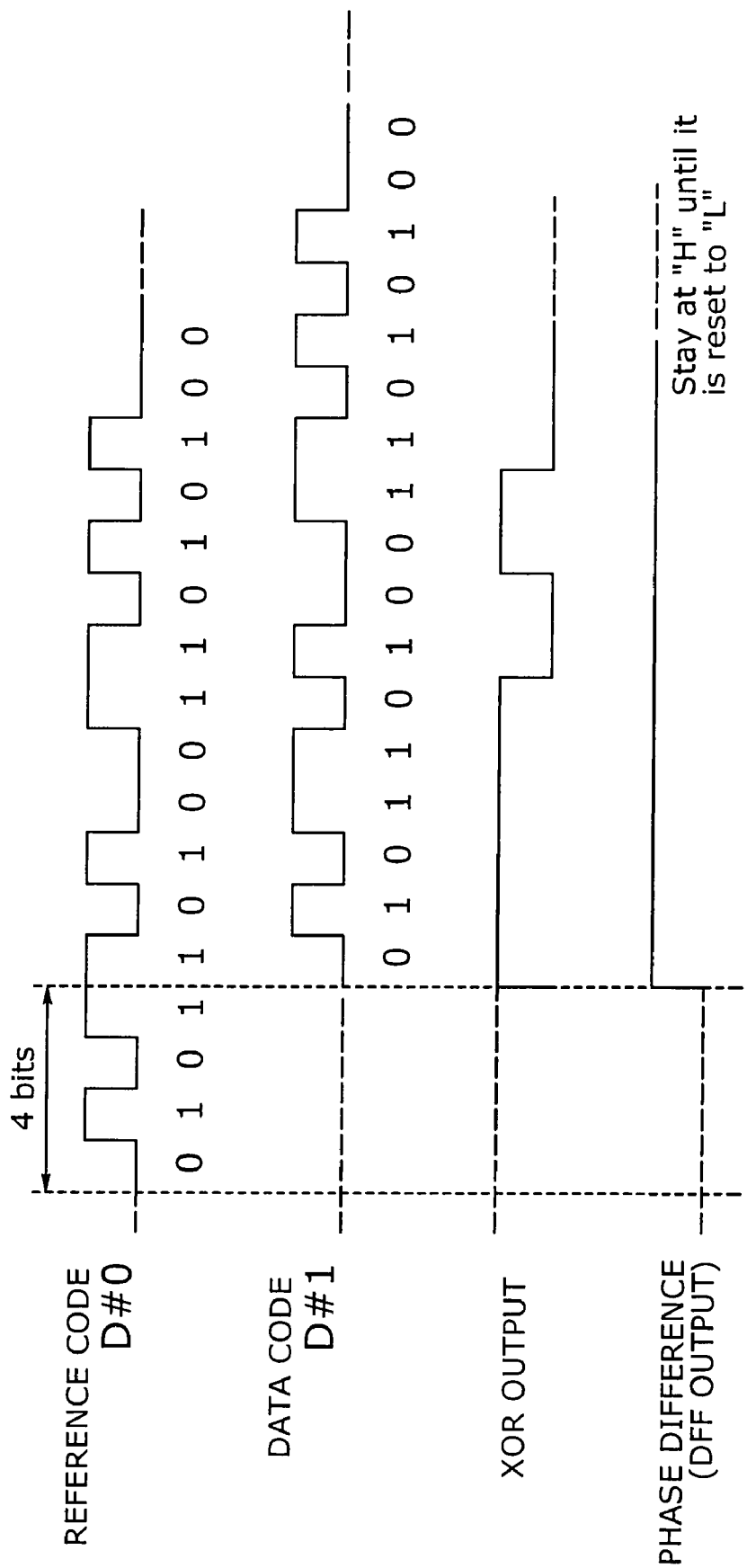
FIG. 7 is a timing diagram showing how a phase difference is detected.
Figure 8:
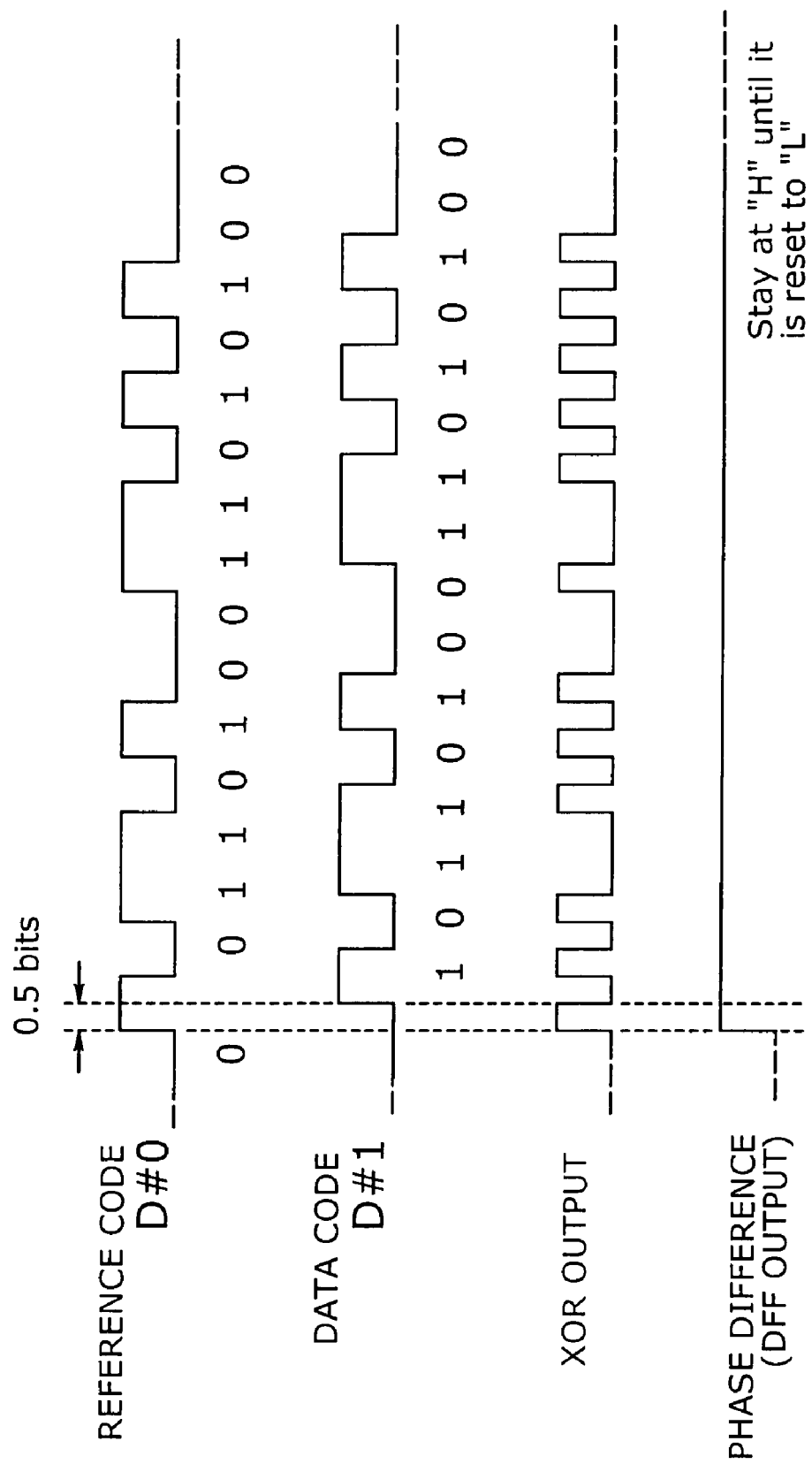
FIG. 8 is another timing diagram showing how a phase difference is detected.

FIGS. 7 and 8 are timing diagrams showing how the error detector 11a detects a phase difference. Specifically, FIG. 7 shows a case where data code D#1 has a four-bit delay with respect to reference code D#0, while FIG. 8 shows the case of a 0.5-bit delay. Their difference in phase causes the D flip-flop 11a-2 to set its phase difference signal output to high. This state of the D flip-flop 11a-2 is maintained until an active reset signal comes at the end of each monitoring period.

With a simple combination of an XOR gate and a flip-flop, the error detector 11a can detect a phase difference not only when it is more than one bit, but also when it is smaller than one bit time. Unlike the conventional clock-based detection method, the performance of the error detector 11a is not limited by the bitrate of serial data.

Let M represent the monitoring period of phase difference measurement. The D flip-flop 11a-2 sets its output (i.e., phase difference signal) to high if any difference between reference code D#0 and data code D#1 is found during the monitoring period M. Given a set of sweep parameters and monitoring period parameters M, the code error rate calculator 11a-4 repeats the monitoring N times, each for the duration of M. If the result is L occurrences of an active phase difference signal, then the code error rate is calculated as (L/M×N). Initiation and termination of each monitoring cycle are controlled by negating and asserting a reset signal to the D flip-flop 11a-2, respectively.

Figure 9:
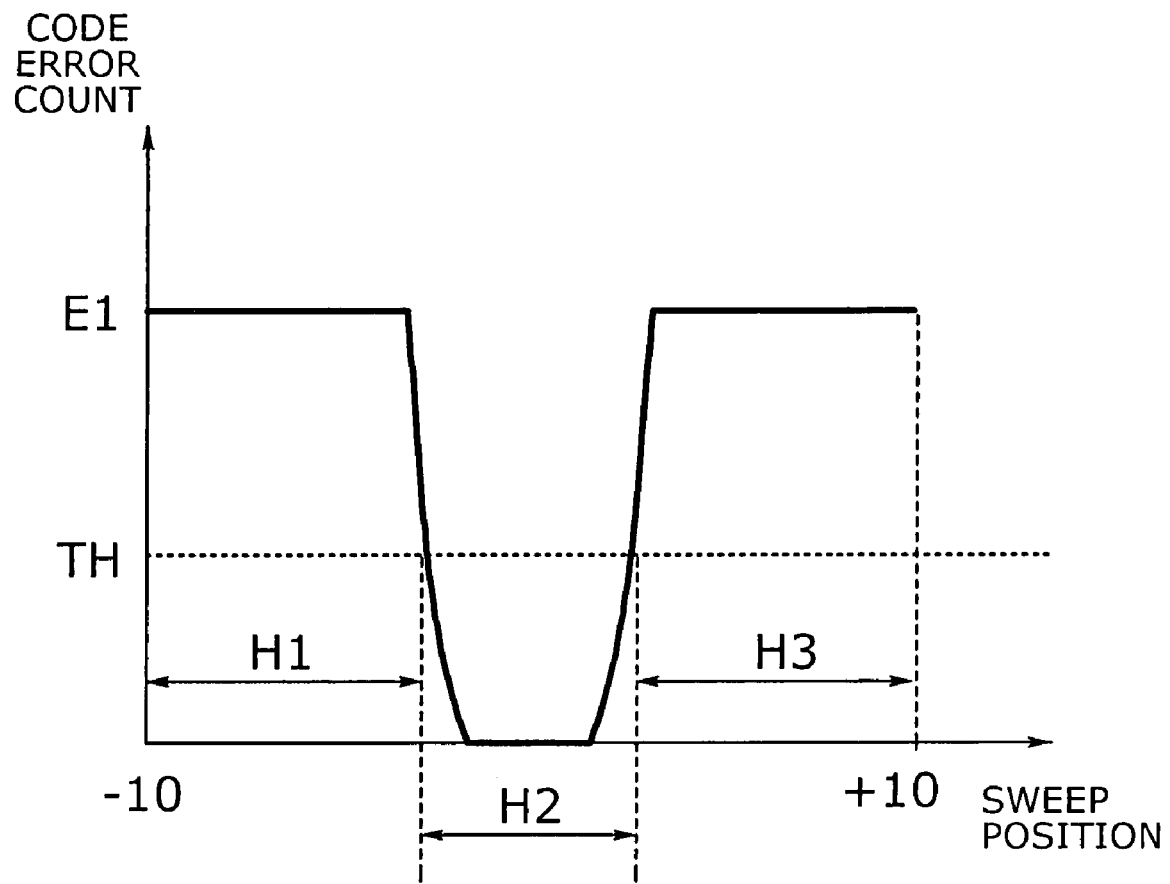
FIG. 9 shows a threshold of code errors.

The process of phase detection could be shortened by narrowing the sweeping range according to whether the code error count is below a threshold. The phase difference detector 11-1 uses a threshold TH in evaluating code error counts, as indicated by the horizontal broken line in FIG. 9. The example of FIG. 9 shows two regions H1 and H3 where the code error count is above the threshold TH. In H1 and H3, the phase difference detector 11-1 skips calculation of code error rates since the data code D#1 is considered to have a large phase difference with respect to the reference code D#0. That is, upon detection of many code errors exceeding the threshold TH, the phase difference detector 11-1 terminates the current measurement immediately and proceeds to the next sweep position. In the middle region H2, on the other hand, the code error count is below the threshold TH, which permits the phase difference detector 11-1 to calculate a code error rate, fully repeating a predetermined number of monitoring cycles. This control makes it possible to reduce the time required for phase correction in the initialization stage.

Figure 10:
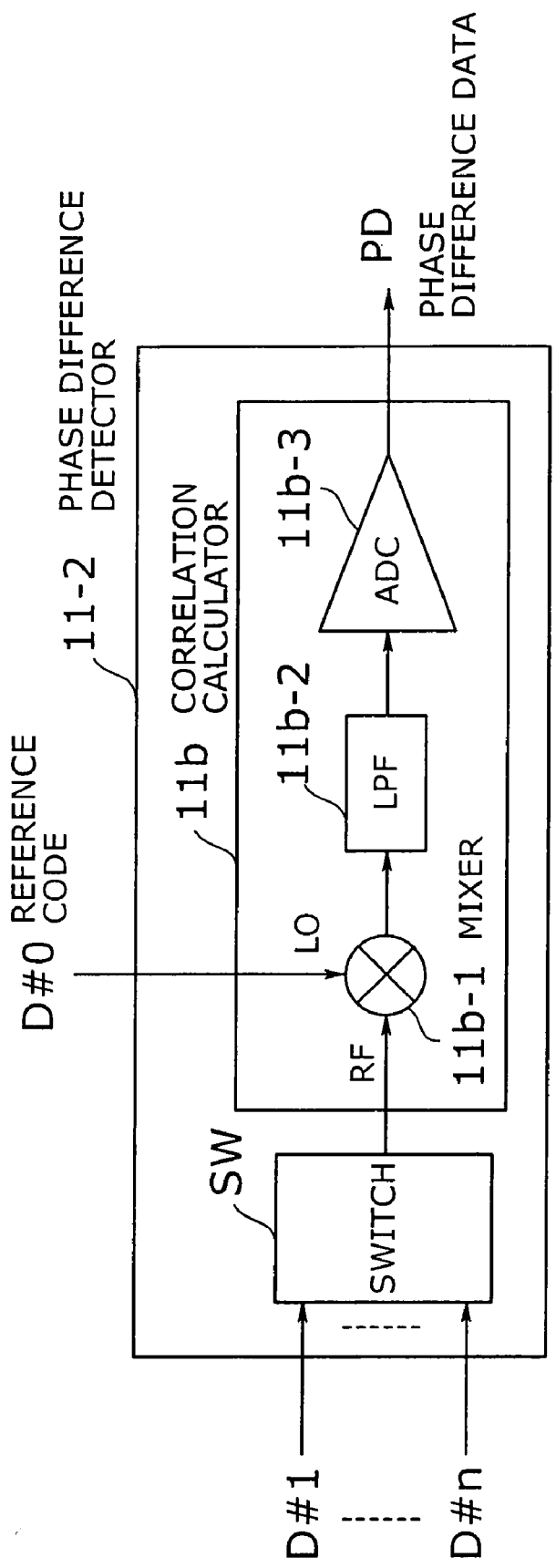
FIG. 10 shows the structure of a phase difference detector.

As an alternative implementation of the phase difference detector 11-1, it may calculate correlation between reference code D#0 and data code D#1 to detect a phase difference. FIG. 10 shows the structure of a phase difference detector of this alternative version. The illustrated phase difference detector 11-2 has a switch SW and a correlation calculator 11b. The correlation calculator 11b is composed of a mixer 11b-1, a lowpass filter (LPF) 11b-2, and an analog-to-digital (A/D) converter 11b-3.

In the correlation calculator 11b, the mixer 11b-1 mixes a selected data code, say D#1, with reference code D#0 to detect their correlation within a given sweep range. The LPF 11b-2 removes harmonic components from the analog correlation signal appearing at the mixer output. The A/D converter 11b-3 converts the LPF output to digital values, thus providing phase difference data PD.

More specifically, the mixer 11b-1 multiplies corresponding code bits of reference code D#0 and data code D#1 to yield a correlation value. If, for example, that the reference code D#0 has a code bit value of "1" at a particular moment, while the data code D#1 shows a value of "1" at the same moment, then their correlation will be "1" since the two code bit values agree with each other. For another example, suppose that the reference code D#0 has a code bit value of "1" while the data code D#1 shows a value of "0." In this case, the correlation value should be "0" since the two code bit values disagree. The mixer 11b-1 outputs a signal with an amplitude that is proportional to the degree of correlation between two given data codes.

Figure 11A:
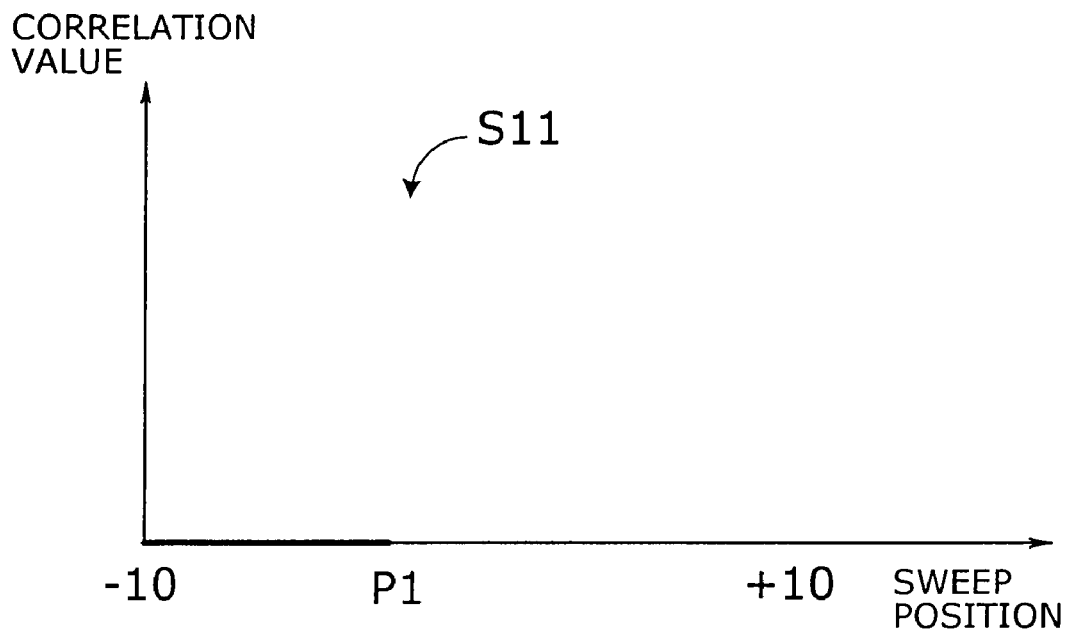
FIGS. 11A, 11B, 12A, and 12B show correlation values at different sweep positions.
Figure 11B:
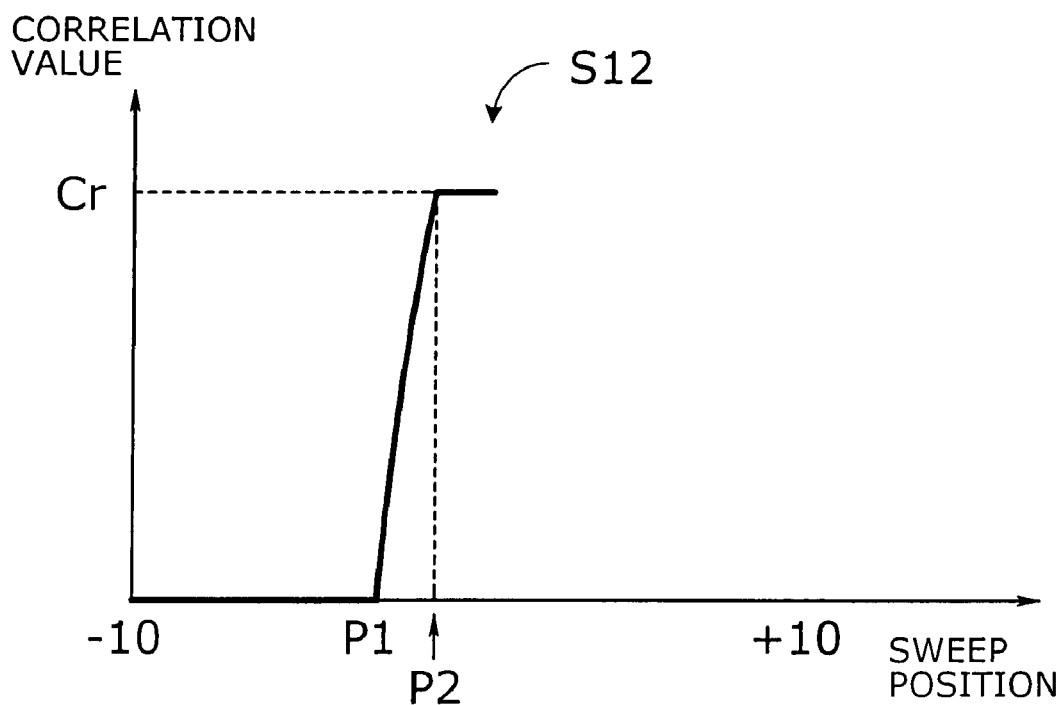
Figure 12A:
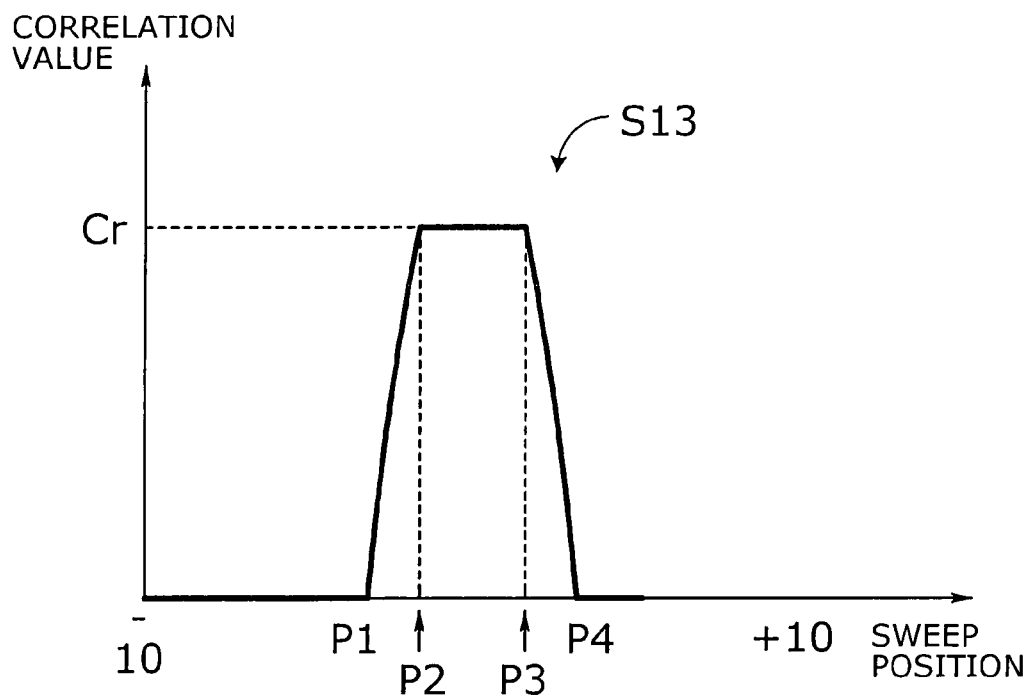
Figure 12B:
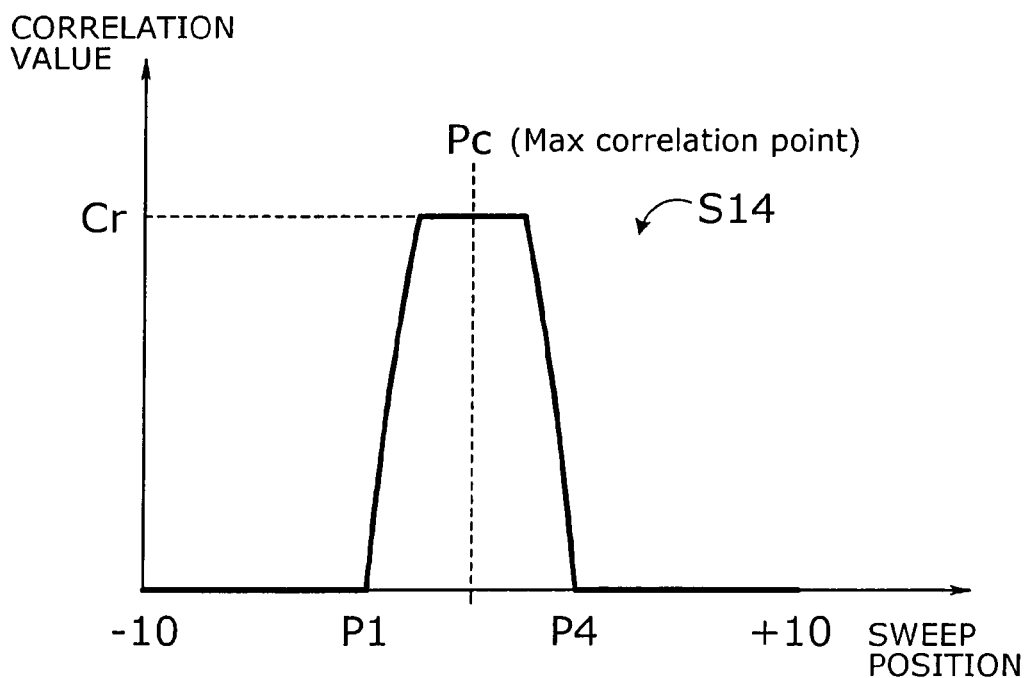

Referring next to FIG. 11A and subsequent diagrams, the following will de scribe phase correction, at the initialization stage. FIGS. 11A, 11B, 12A, and 12B show correlation values at different sweep positions. The vertical axis represents correlation values and the horizontal axis represents sweep positions in a range of −10 to +10. The correlation value changes as the data code D#1 is shifted across the given range. This process proceeds in the following way:

(S11) The sweep begins from point −10. The correlation value remains zero until the sweep reaches point P1, meaning that there is no correlation between reference code D#0 and data code D#1.

(S12) The correlation value begins to increase at point P1 and reaches Cr at point P2.

(S13) The correlation value stays at Cr in the range between points P2 and P3. After P3, the correlation value gradually decreases until it hits zero at point P4.

(S14) The correlation value is zero in the remaining range, point P4 to point +10.

In this way the phase of data code D#1 is varied within a range of −10 to +10 relative to the reference code D#0. The correlation values measured during this sweep are sent by the correlation calculator 11b to the correction signal generator 12 as phase difference data PD. Of all the received measurements, the correction signal generator 12 extracts a piece of phase difference data with the highest correlation value and sends it as a correction signal C1 to the phase setter 21. Since the correlation value hits a peak Cr at point Pc in the present example, the data at that point is extracted as a correction signal C1, which causes the phase setter 21 to configure the code generator 22a so that the data code D#1 will start at point Pc. The code generator 22a begins generating data code D#1 according to what the phase setter 21 has set up.

The above phase correction process may be applied to the other data codes D#2 to D#n, so that the phase of every data code D#1 to D#n will be adjusted at the time of initial setup.

Or, if required, each data code D#1 to D#n may be given a different phase. In this case the correction signals C1 to Cn should be modified to have different values to specify intended phase angles.

Figure 13:
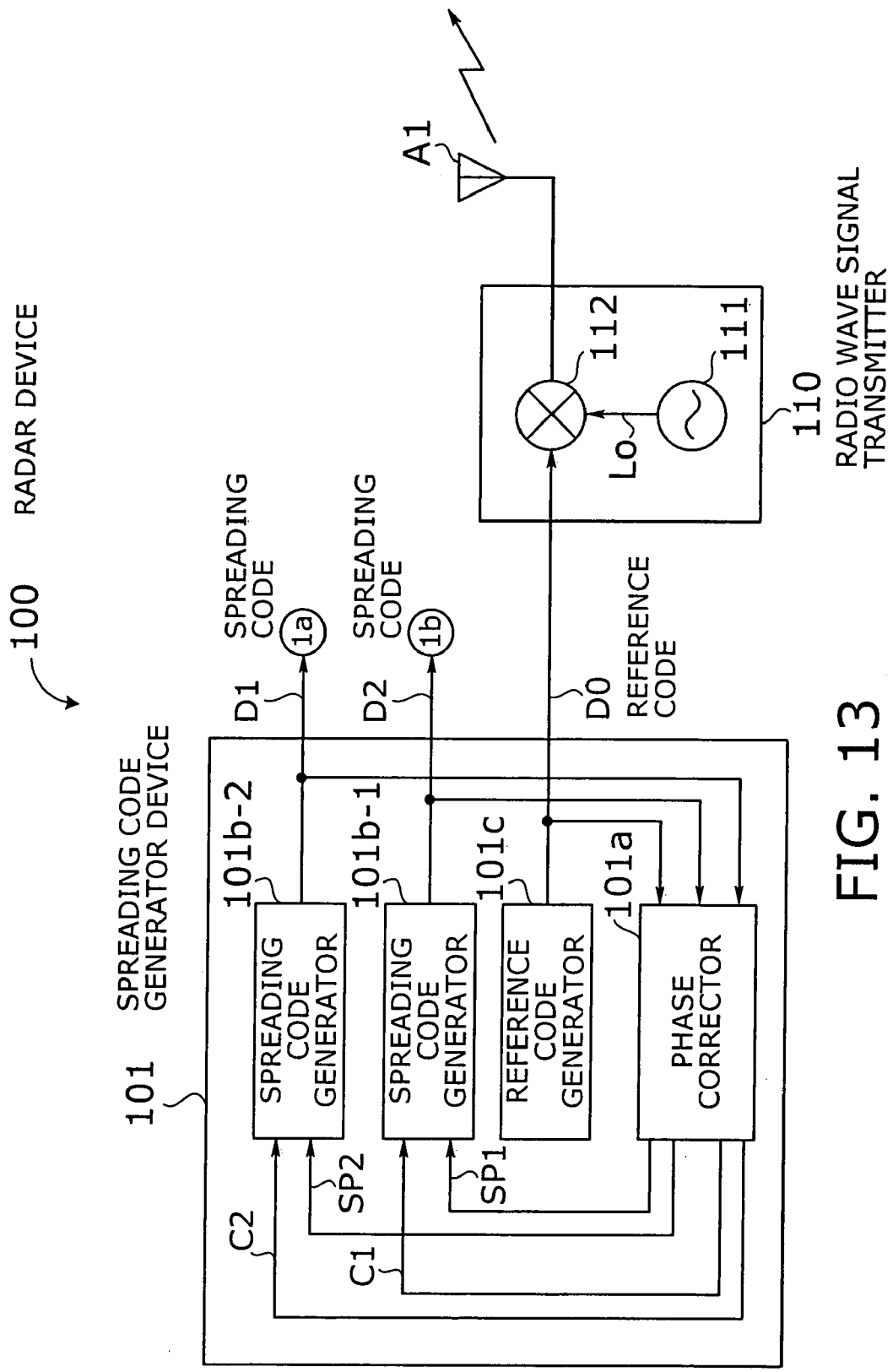
FIGS. 13 and 14 are a block diagram of a radar device.
Figure 14:
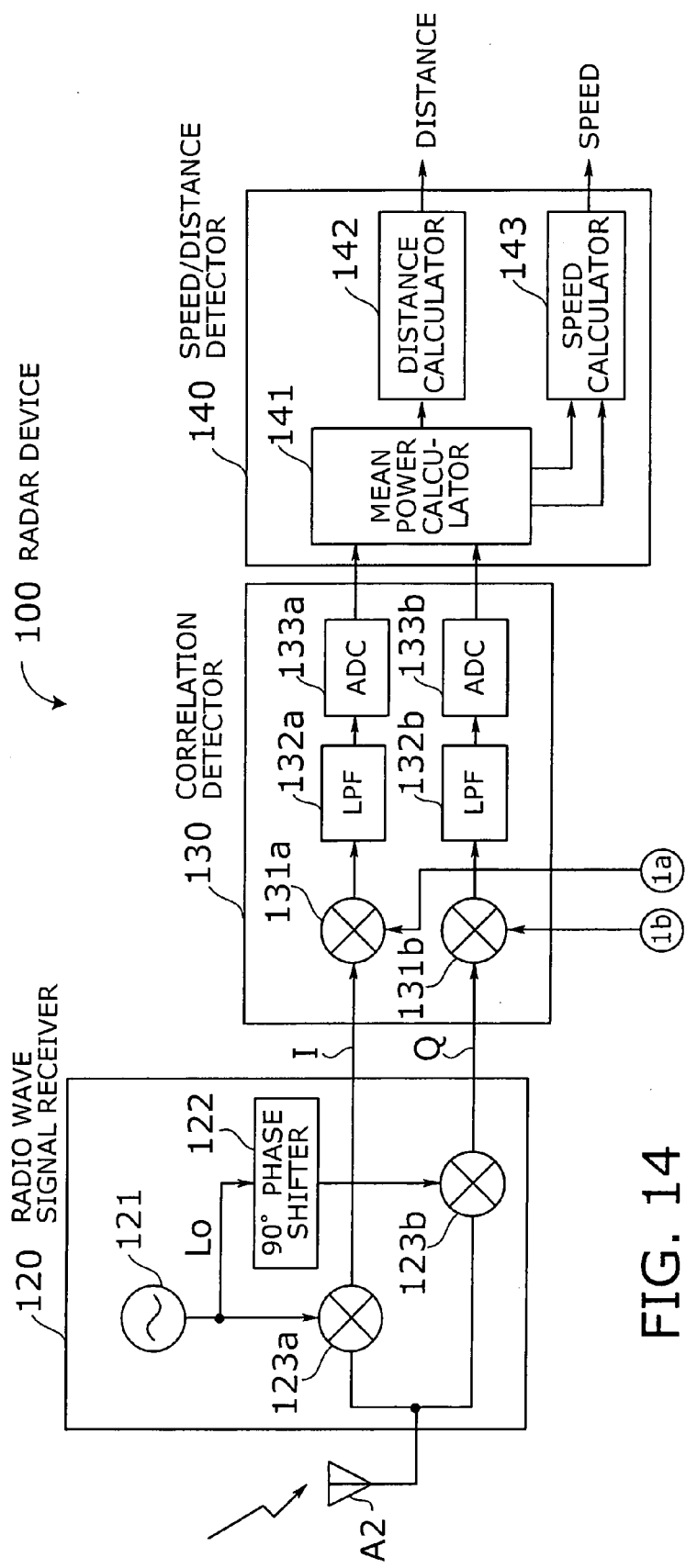
Figure 15A:
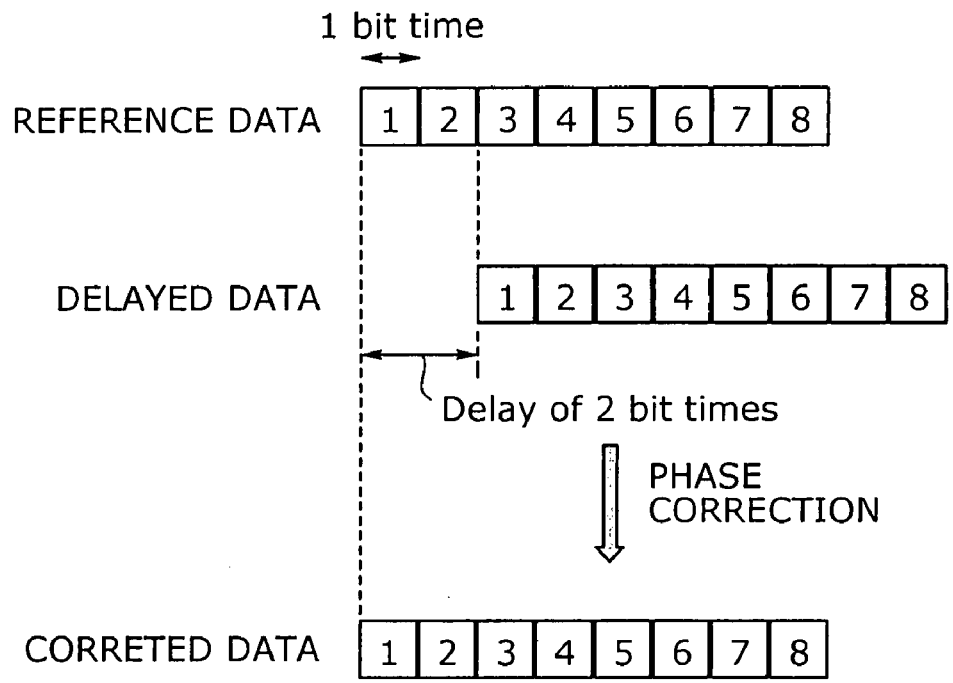
FIG. 15A illustrates bitwise correction of phase difference.
Figure 15B:
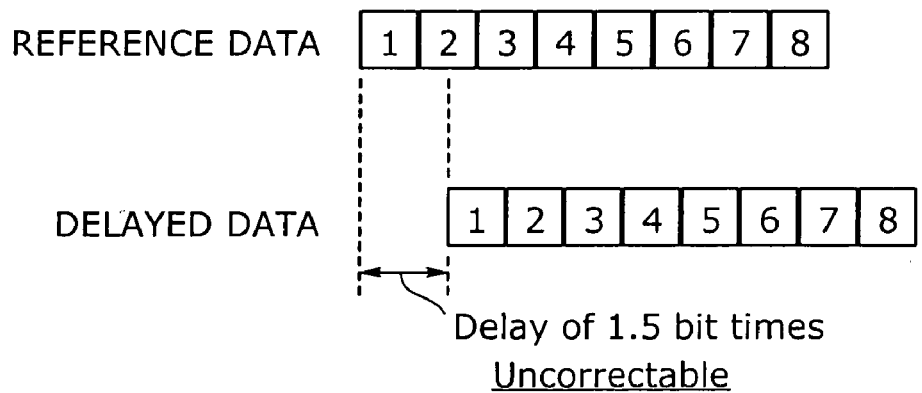
FIG. 15B illustrates a phase difference of one and half bits, which is uncorrectable.

The data code transmission device 1 of the present invention can be applied to radar devices. FIGS. 13 and 14 give a block diagram of a radar device. This radar device 100 uses ultra wide band (UWB) waves to measure the distance and relative speed between objects. Applications of such radar devices include the intelligent transport systems (ITS) using inter-vehicle communication (IVC) technologies.

The illustrated radar device 100 comprises a spreading code generator device 101, a radio wave signal transmitter 110, a radio wave signal receiver 120, a correlation detector 130, a speed/distance detector 140, a transmitting antenna A1, and a receiving antenna A2. Referring to FIG. 13, the spreading code generator device 101 corresponds to what we have described as the data code transmission device in the present invention. The spreading code generator device 101 is composed of a phase corrector 101a, spreading code generators 101b-1 and 101b-2, and a reference code generator 101c. The radio wave signal transmitter 110 has a local oscillator 111 and a mixer 112.

Referring to FIG. 14, the radio wave signal receiver 120 is composed of a local oscillator 121, a 90° phase shifter 122, and mixers 123a and 123b. The correlation detector 130 is composed of mixers 131a and 131b, LPFs 132a and 132b, and A/D converters 133a and 133b. The speed/distance detector 140 is composed of a mean power calculator 141, a distance calculator 142, and a speed calculator 143.

The radar device of FIGS. 13 and 14 operates as follows. The mixer 112 in the radio wave signal transmitter 110 mixes a reference code D0 from the reference code generator 101c with a local oscillator signal Lo (carrier wave) from the local oscillator 111, thus modulating the latter using a binary phase shift keying (BPSK) technique. The modulated radio signal is emitted into the air via the transmitting antenna A1.

Under the control of the phase corrector 101a, the spreading code generators 101b-1 and 101b-2 send out spreading codes D1 and D2 after a specified delay time. When this known time offset is taken in consideration, those spreading codes D1 and D2 are in phase with reference code D0. Also, the phase correction control of the present invention has made the spreading codes D1 and D2 in phase with each other. Two spreading code generators 101b-1 and 101b-2 produce spreading codes D1 and D2 while varying their phase offsets. That is, the two in-phase spreading codes D1 and D2 are phase-shifted together in a predetermined number of ways.

The radio wave reflected by an object arrives at the receiving antenna A2. The mixer 123a demodulates the received reflection signal by mixing it with a local oscillator signal Lo supplied by a local oscillator 121, thereby extracting an in-phase (I channel) component from the signal. The 90° phase shifter 122, on the other hand, gives a phase shift of 90 degrees to the local oscillator signal Lo for use in another mixer 123b. The mixer 123b demodulates the received reflection signal by mixing it with the shifted local oscillator signal, thereby yielding a quadrature (Q channel) component of the received signal.

The subsequent mixers 131a and 131b perform a despreading process on the I-channel and Q-channel signals by mixing them with spreading codes D1 and D2, respectively. This demodulation process applies N different phases on the spreading codes D1 and D2, which produces N different result values of correlation detection.

The low-pass filters 132a and 132b remove harmonics components from the output of the mixers 131a and 131b, and the subsequent A/D converters 133a and 133b convert those filter outputs into digital values. The mean power calculator 141 calculates mean power of the detected signals for each particular phase. The distance calculator 142 finds a signal with the largest mean power and uses the phase of that signal to calculate the distance of the object. The speed calculator 143 calculates a Doppler shift from the mean power values, thus determining relative speed of the object.

To summarize the preceding discussion, the proposed data code transmission device is designed to detect phase difference between a data code and a reference code by shifting the data code in a predetermined sweep range, produces a correction signal from the phase difference to keep the data code in phase with the reference code, and optimizes the phase of the data code according to the correction signal. This structure permits a plurality of high-speed serial lines to send phase-corrected data codes, thus improving the quality of data transmission. The proposed device compensates for a phase error of a fraction of bit time, in addition to performing bitwise phase correction. The algorithm for phase difference detection is based on code error or correlation of data codes, which works effectively regardless of signal formats used or uncertain initial state of a device after power-up.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A radar device that detects an object, comprising:
   (a) a spreading code generator device, comprising:
   a reference code generator that generates a reference code,
   a phase corrector that produces a sweep command signal for use in shifting the phase of a spreading code in a predetermined sweep range, compares the phase of the spreading code being shifted with the phase of the reference code to obtain phase difference data, and produces a correction signal based on the phase difference data to keep the spreading code in phase with the reference code, and
   a spreading code generator that shifts the spreading code in response to the sweep command signal, optimizes the phase of the spreading code according to the correction signal and produces the spreading code while varying its phase offset;
   (b) a radio wave signal transmitter that produces a radio wave signal by modulating a carrier wave with the reference code and emits the radio wave signal;
   (c) a radio wave signal receiver that receives the radio wave signal reflected by an object and demodulates the received radio wave signal into an in-phase component and a quadrature component;
   (d) a correlation detector that produces correlation-detected values by performing correlation detection of the in-phase and quadrature components using the spreading code; and
   (e) a speed/distance detector that calculates power of correlation-detected values to determine a distance to the object and a speed of the object.

2. The radar device according to claim 1, wherein said phase corrector determines a code error rate of the spreading code being shifted in the sweep range by comparing the spreading code with the reference code and outputs the code error rate at each sweep position as the phase difference data.

3. The radar device according to claim 2, wherein:
   a threshold is defined for the number of code errors detected;
   said phase corrector produces the sweep command signal only within a part of the sweep range where the number of code errors detected is below the threshold.

4. The radar device according to claim 1, wherein said phase corrector comprises a mixer that mixes the spreading code with the reference code to determine correlation therebetween in the sweep range and outputs the resulting correlation value at each sweep position as the phase difference data.

\* \* \* \* \*